(12) United States Patent
Aoyama

(10) Patent No.: US 6,683,675 B2
(45) Date of Patent: Jan. 27, 2004

(54) DISTANCE MEASURING APPARATUS AND DISTANCE MEASURING METHOD

(75) Inventor: Chiaki Aoyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/984,446

(22) Filed: Oct. 30, 2001

(65) Prior Publication Data

US 2002/0051128 A1 May 2, 2002

(30) Foreign Application Priority Data

Oct. 30, 2000 (JP) ........................................ 2000-331532

(51) Int. Cl.[7] ................................................ G01C 3/00
(52) U.S. Cl. ......................................... 356/3.03; 901/47
(58) Field of Search ................... 901/47; 356/3.01–3.16

(56) References Cited

U.S. PATENT DOCUMENTS

| 4,204,772 A | * | 5/1980 | Balasubramanian |
| 4,921,345 A | * | 5/1990 | Tsuchitani et al. |
| 4,979,815 A | * | 12/1990 | Tsikos |
| 5,151,608 A | * | 9/1992 | Torii et al. ................. 250/561 |
| 5,754,280 A | * | 5/1998 | Kato et al. ................. 356/3.06 |
| 5,812,269 A | | 9/1998 | Svetkoff et al. |
| 6,137,577 A | | 10/2000 | Woodworth |
| 6,483,536 B2 | | 11/2002 | Aoyama |

FOREIGN PATENT DOCUMENTS

| DE | 197 21 688 A1 | 9/1998 |
| JP | 63-142210 | * 6/1988 |
| JP | A 5-119154 | 5/1993 |
| JP | A 7-280532 | 10/1995 |
| JP | A 8-504505 | 5/1996 |
| JP | A 10-38522 | 2/1998 |
| JP | A 10-48336 | 2/1998 |
| JP | A 2000-028317 | 1/2000 |

OTHER PUBLICATIONS

Rainer Schuhmann et al., "Telezentrische Systeme für die optische Meβ– und Prüftechnik (Telecentric Systems for Optical Measurement and Testing)", Technisches Messen TM, R. Oldenbourg Verlag, Munchen, DE, vol. 65 (1998), No. 4., pp. 131–136.

* cited by examiner

Primary Examiner—Stephen C. Buczinski
(74) Attorney, Agent, or Firm—Birch, Stewart, Kolasch & Birch, LLP

(57) ABSTRACT

A distance measuring apparatus is provided which utilizes a light-section method capable of preventing input of disturbance light without narrowing measurement viewing angle. The apparatus comprises: a laser emitting section for generating laser light, an imaging section for imaging reflected light reflected by a surface of a target object, a telecentric optical system lens for forming an image of the reflected light on the imaging section, an optical filter provided between the telecentric optical system lens and the imaging section and perpendicular to an optical axis of the telecentric optical system lens, for passing light of a wavelength band of laser light emitted from the laser emitting section, and a distance calculation section for calculating a distance to the object based on an image taken by the imaging section and a positional relationship between a light emission position of the laser light and an image position.

4 Claims, 5 Drawing Sheets

DISTANCE MEASURING APPARATUS AND DISTANCE MEASURING METHOD

BACKGROUND OF THE INVENTION

1. Field of the Invention

The present invention relates to a distance measuring apparatus and to a method for measuring the distance from the apparatus to an object by imaging reflected light of laser light emitted from the apparatus, and then referring to a positional relationship between the light emission position and the image position.

2. Description of the Related Art

Recently, CCD (Charged Coupled Device) cameras and computer image processing techniques have been improved, and accordingly, three-dimensional measurement methods using images have become common. An example of such three-dimensional measurement methods using a CCD camera and computer image processing is a light-section method. In the light-section method, light passing through a slit is projected onto a target object to be measured, so as to virtually cut the object using a band-shaped light, and a cut surface is observed in a direction other than the direction of the projected light. Because very fine and intense light beams can be obtained by laser technology, even an object having an irregular surface can be measured at high speed and with high accuracy by employing three-dimensional measurement using the light-section method.

Generally, in the light-section method, the distance to the target object is determined using the principle of triangulation. In triangulation, a triangle is defined by connecting two known reference points and any other third point, and the position of the third point is determined by measuring the angles of the triangle. More specifically, in the light-section method, light which is emitted from a light source within a distance measuring apparatus and passes through a slit is projected onto an object, and the reflected light from the surface of the object is imaged by a CCD camera provided within the distance measuring apparatus. The distance between the distance measuring apparatus and the target object is measured based on the direction of the emitted light and the positions of the light source and the CCD camera. Therefore, it is preferable that the intensity of the reflected light imaged by the CCD camera is constant. Moreover, in the case where the light generated by the distance measuring apparatus is imaged by a CCD camera or the like, it is convenient from the point of image processing, that light which the apparatus has not emitted is not input to the CCD camera. Therefore, in measuring using light, generally an optical filter is used which only passes light of a wavelength of the light emitted by the apparatus, so that light of the surrounding environment is not input.

However, when a floor surface or an obstacle on a floor surface is detected using the light-section method in an optical sensor of a self-controlled mobile robot, if the measurement range of the viewing angle is wider, more candidates can be selected for the movement path. Therefore, it is desirable to use an optical system having a wide viewing angle. On the other hand, an optical filter constituted so as to only pass a specific wavelength band by using interference, has a characteristic in that the pass central wavelength changes according to the incident angle of the incident light.

Therefore if measurement is performed by attaching to an optical system of a CCD camera, an optical filter constituted so as to pass only a wavelength band of laser light generated by the apparatus, the viewing angle becomes narrow. Consequently, the range which can be measured becomes narrow and the path selection process becomes difficult. Furthermore, in the case of imaging laser light generated by the apparatus at a wide angle of view, the pass wavelength band of the optical filter must be made wide. However, if the pass wavelength band is made wide, disturbance light external to the laser light is also imaged. Therefore processing for extracting only laser light from the obtained image must be performed solely by image processing, making the image processing complex. Consequently, this invites a drop in processing speed, and the traveling speed of the self-controlled mobile robot is thus reduced.

SUMMARY OF THE INVENTION

In consideration of the above circumstances, an object of the present invention is to provide a distance measuring apparatus and a distance measuring method utilizing a light-section method capable of preventing input of disturbance light without narrowing measurement viewing angle.

A distance measuring apparatus according to the present invention comprises: a laser emitting section for generating laser light, an imaging section for imaging reflected light of the laser light which has been reflected by a surface of a target object to be measured, a telecentric optical system lens for forming an image of the reflected light on the imaging section, an optical filter provided between the telecentric optical system lens and the imaging section and perpendicular to an optical axis of the telecentric optical system lens, for passing only light of a wavelength band of laser light emitted from the laser emitting section, and a distance calculation section for calculating a distance to the object based on an image taken by the imaging section, based on a positional relationship between a light emission position of the laser light and an image position.

In a distance measuring method according to the present invention, laser light is emitted onto a target object to be measured, and laser light reflected by the object is perpendicularly input by an imaging optical system onto an incident surface of an optical filter which passes only light of a wavelength band of the laser light, and the reflected light which has been passed by the optical filter is imaged, and the distance to the object is measured based on the obtained image and a positional relationship between a light emission position of the laser light and the image position.

According to the present invention, in a case where reflected light of laser light such as slit light emitted from an apparatus is imaged, and the distance to an object is measured by referring to a positional relationship between the light emission position of the laser light and the image position, then because the imaging optical system is constructed so that the reflected light is input perpendicular to the incident surface of the optical filter which passes only light of a wavelength band of the laser light emitted by the apparatus, the disturbance light can be removed without narrowing the measurement viewing angle. Furthermore, since in the image to be imaged, only the reflected light of the laser light is included, measurement of the floor surface and recognition processing for an obstacle on the floor surface can be simplified. Moreover, since the disturbance light is removed and recognition processing for an obstacle is simplified, when the present invention is applied to a visual sensor of a self-controlled mobile robot, for example, it is possible to prevent the traveling speed of the self-controlled mobile robot from being reduced.

DETAILED DESCRIPTION OF THE PREFERRED EMBODIMENTS

As follows is a description of a distance measuring apparatus according to an embodiment of the present invention, with reference to the drawings.

Figure 3:
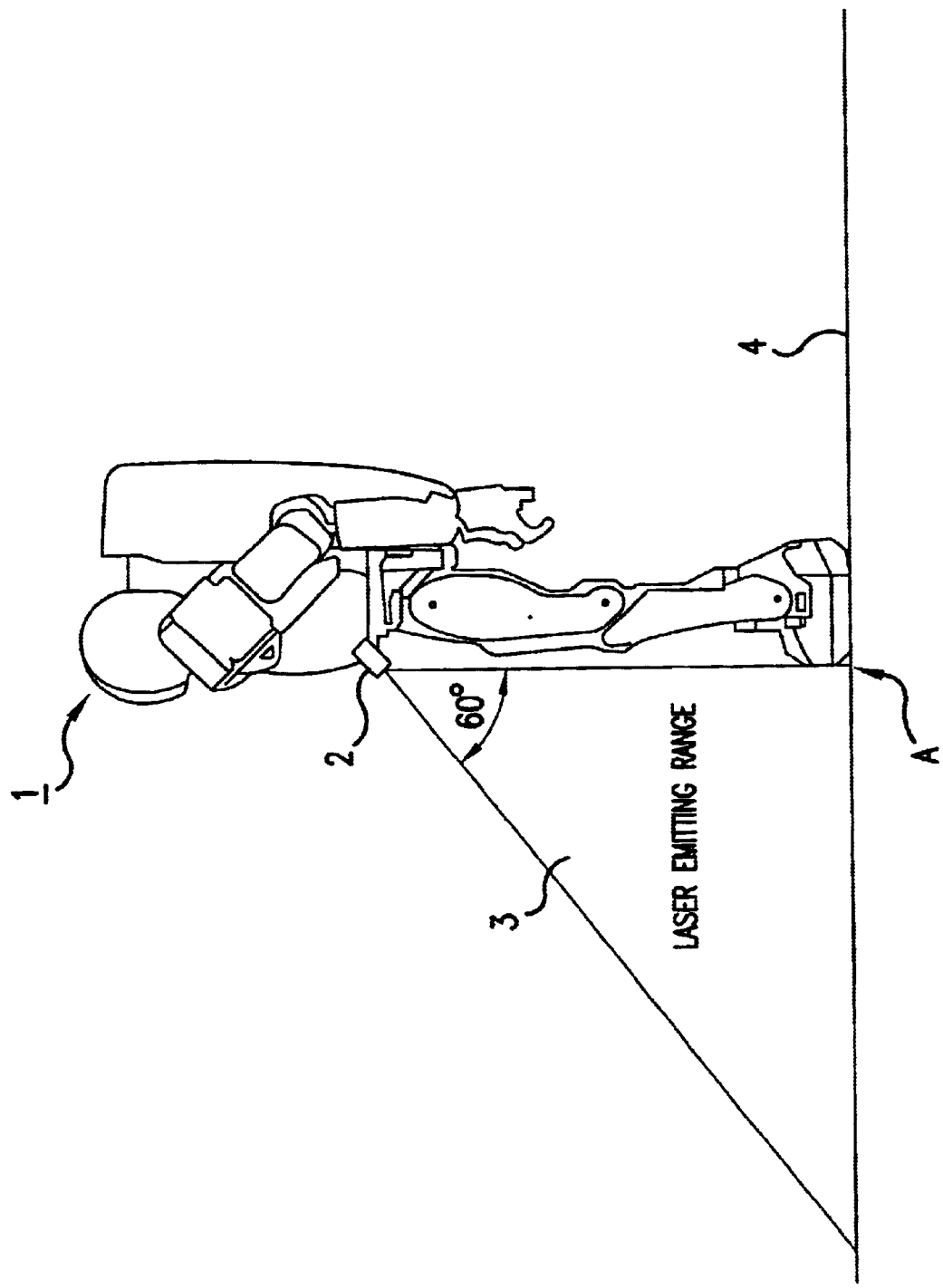
FIG. 3 is a diagram showing the external appearance of a bipedal robot 1.

First, with reference to FIG. 3, a bipedal robot to which a distance measuring apparatus is attached will be described. In FIG. 3, reference numeral 1 indicates a self-controlled bipedal robot (hereinafter abbreviated to 'robot'). Reference numeral 2 indicates an optical system of the distance measuring apparatus which is attached to the robot 1 at waist level. Reference numeral 3 indicates a laser light emission range of the optical system 2, where the laser light which has passed through a slit (also referred to hereunder as slit light) is spread over 60 degrees in a single plane, with this slit light being projected towards a floor surface 4. In addition, the orientation of the optical system 2 is adjusted so that the slit light is projected onto the floor surface in front of the tip of a foot of the robot 1.

Figure 1:
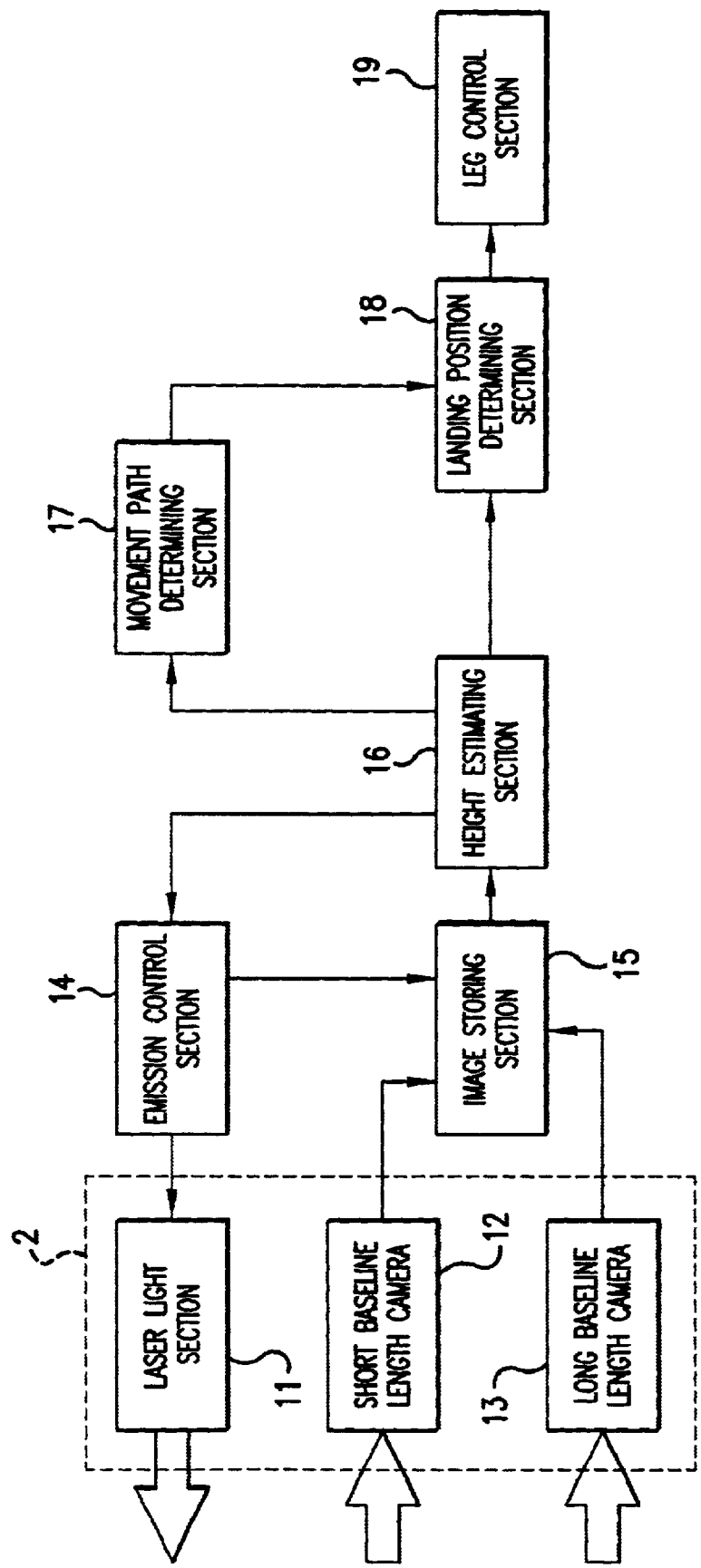
FIG. 1 is a block diagram showing the structure of a distance measuring apparatus according to an embodiment of the present invention.

FIG. 1 is a block diagram showing the structure of the distance measuring apparatus according to the present embodiment. In this figure, reference numeral 11 indicates a laser light source for emitting laser light towards the target object to be measured. Reference numeral 12 indicates a short baseline length camera arranged close to the laser light source 11, and comprises a CCD camera. Because the short baseline length camera 12 has a short baseline length the accuracy for measuring distance is poor, although a large distance range in front of the robot 1 can be observed with this camera 12. Reference numeral 13 indicates a long baseline length camera arranged away from the laser light source 11, and also comprises a CCD camera. Because this long baseline length camera 13 has a long baseline length the associated accuracy for measuring distance is high, although the distance range in front of the robot 1 is limited.

Reference numeral 2 indicates the optical system shown in FIG. 3, and incorporates the laser light source 11, the short baseline length camera 12 and the long baseline length camera 13. Reference numeral 14 indicates an emission control section for controlling the laser light source 11 by outputting a control signal which controls the emission of the laser light to the laser light source 11. Reference numeral 15 indicates an image storing section having an image memory for storing the image signals output from the two cameras.

Reference numeral 16 indicates a height estimating section for estimating the height of an object ahead by referring to the distance to the object determined based on the image data stored in the image storing section 15. Reference numeral 17 indicates a movement path determining section for determining the path of movement of the robot 1 in accordance with the state of the target object as estimated by the height estimating section 16. Reference numeral 18 indicates a landing position determining section for determining the landing position of the legs of the robot 1 based on the path chosen by the movement path determining section 17 and the height of the object estimated by the height estimating section 16. Reference numeral 19 indicates a leg control section for controlling the legs so as to land the foot on the landing position determined by the landing position determining section 18.

Figure 2:
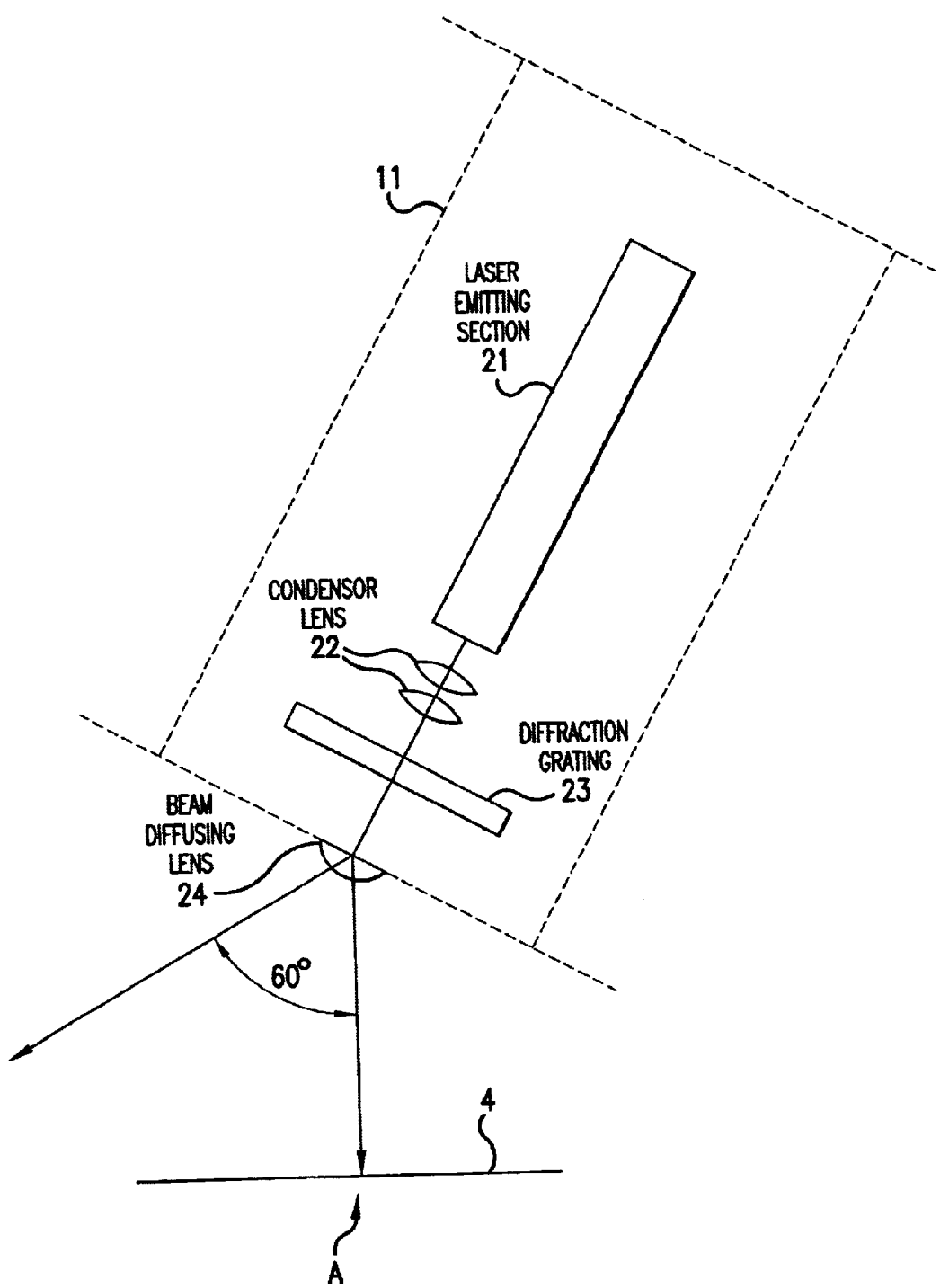
FIG. 2 is a block diagram showing the structure of a laser light source 11 shown in FIG. 1.

Next, the structure of the laser light source 11 shown in FIG. 1 will be described in detail with reference to FIG. 2. FIG. 2 is a block diagram showing the structure of the laser light source 11 shown in FIG. 1. In the figure, reference numeral 21 indicates a laser emitting section for emitting laser light. Reference numeral 22 indicates a condenser lens for condensing the laser light emitted from the laser emitting section 21, so as to obtain a narrow, condensed beam. Reference numeral 23 indicates a diffraction grating for dividing the laser beam condensed through the condenser lens 22 into a plurality of beams. Here, the divided beams are aligned in the direction perpendicular to the plane of FIG. 2. Reference numeral 24 indicates a beam diffusing lens using a cylindrical lens or the like. This beam diffusing lens is provided for diffusing each laser beam in a single plane so as to generate a beam having a beam form obtained by passing through a slit. Each of the plurality of beams is diffused by the beam diffusing lens 24 so as to have a diffusion angle of 60 degrees.

Figure 5:
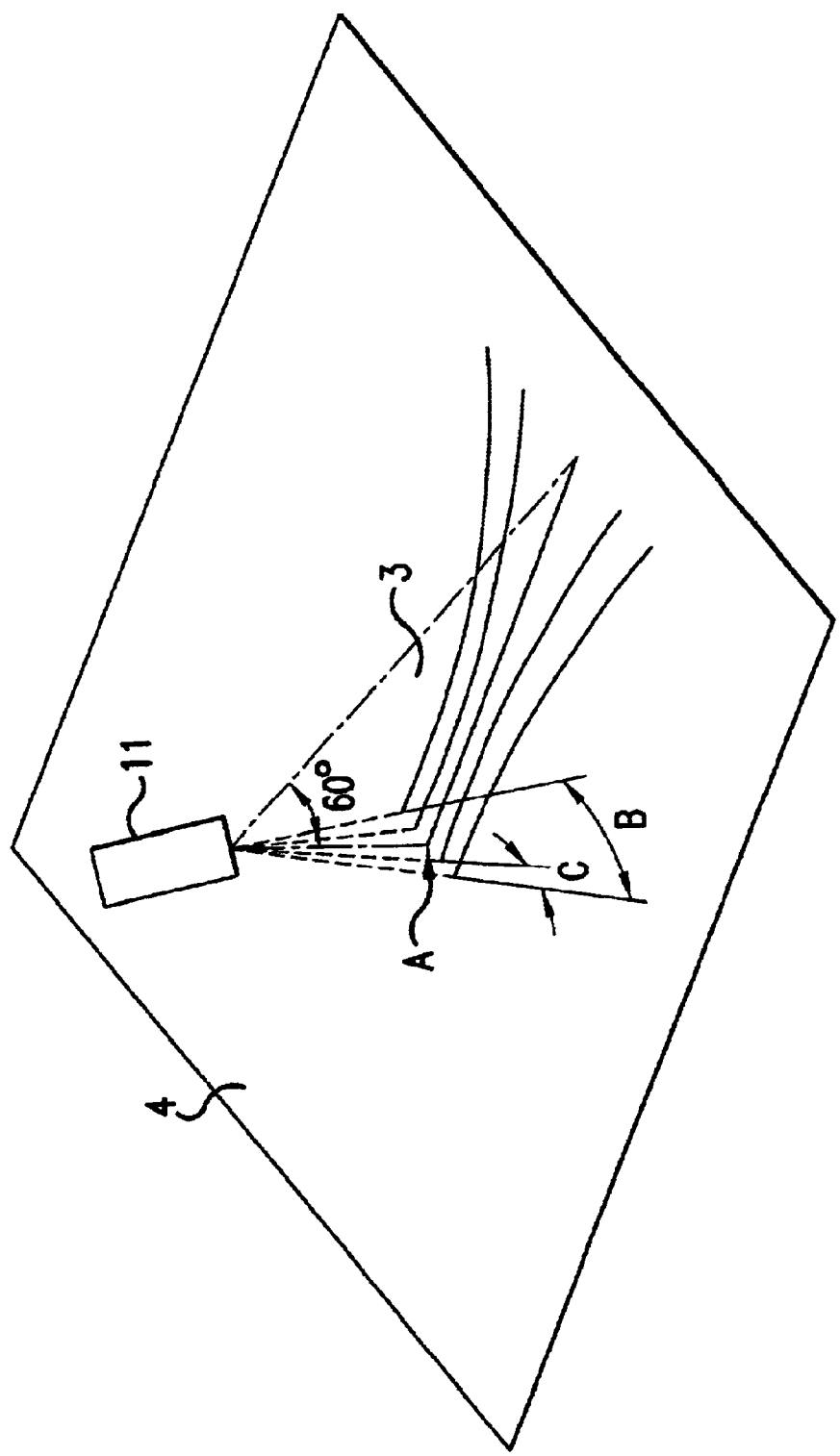
FIG. 5 is a schematic diagram showing a state in which laser light is emitted from an optical system 2.

Moreover, in FIG. 2, in order to show the positional relationship of the floor surface, reference numeral 4 indicates a line representing the floor surface, and reference symbol A indicates the point where the tip of the foot of the robot 1 is positioned. Furthermore, the schematic diagram of FIG. 5 shows a state in which the laser light is emitted from the optical system 2 which is attached to the robot 1 at waist level. In FIG. 5, reference numeral 11 indicates the laser light source. Reference numeral 3 indicates the laser emission range of laser light from the laser light source emitted onto the floor surface 4. Here, the laser light is divided into five beams by the diffraction grating 23, and the five beams are diffused by 60 degrees through the beam diffusing lens 24. These laser beams are projected towards the floor surface 4, and images of the light reflected by the floor surface are taken by the short baseline length camera 12 and the long baseline length camera 13. In FIG. 5, in order to make the figure easy to understand, the diffraction grating 23 divides the laser light into five beams, but in practice, angle B in FIG. 5 is 32 degrees and angle C is 1.6 degrees. Accordingly, the number of beams will be twenty one.

Figure 4:
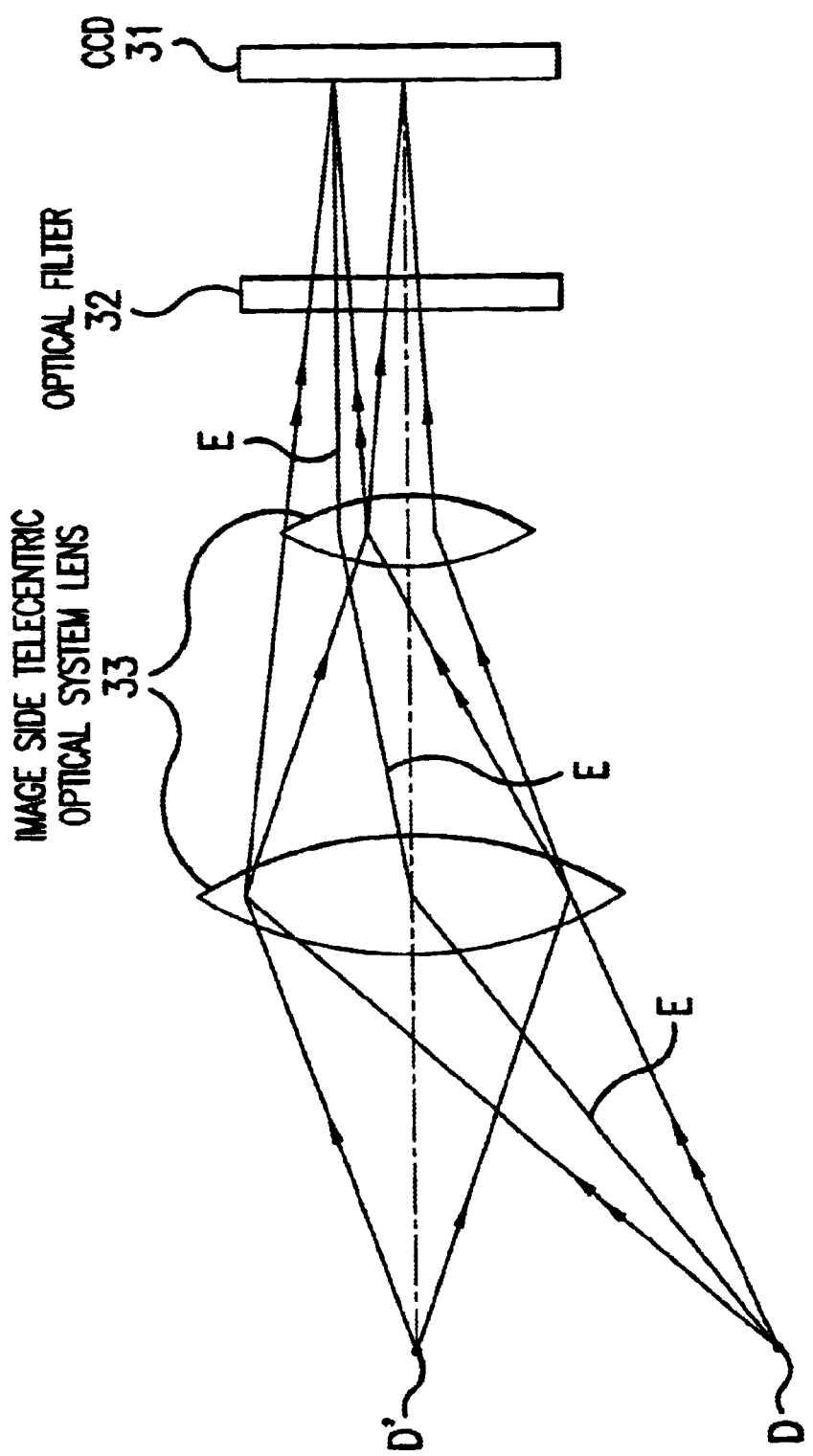
FIG. 4 is a diagram showing a positional relationship between a lens system provided in a short baseline length camera 12 and a long baseline length camera 13 shown in FIG. 1, and an optical filter.

Next, referring to FIG. 4, a description is given of an optical filter and a lens system incorporated in the short base line length camera 12 and the long base line length camera 13 shown in FIG. 1. FIG. 4 is a diagram showing the positional relationship between a lens system provided inside the two cameras, and an optical filter. In this figure, reference numeral 31 denotes a CCD provided inside a camera for imaging an image of the reflected light. The light receiving surface thereof is provided so as to be perpendicular to the optical axis of the lens system provided in the camera. Reference numeral 32 indicates an optical filter which uses interference by a thin film of light wavelength order to pass light of a specified wavelength band, and which is provided so as to be parallel with the light receiving surface of the CCD 31.

The transmission wavelength band of the optical filter 32 is made to coincide with the wavelength band of the laser light emitted from the laser emitting section 21 shown in FIG. 2. Reference numeral 33 indicates an image side telecentric optical system lens which forms an image of light reflected on the target surface of the object to be measured onto the light receiving face of the CCD 31. The image side telecentric optical system lens 33 is a lens which outputs all of the input light perpendicularly. Therefore, the output light becomes parallel to the optical axis of the lens system. Parallel here means that the optical path (denoted by reference symbol E in FIG. 4) for when the light reflected at the point D shown in FIG. 4 forms an image on the CCD 31, is parallel with the optical axis of the image side telecentric optical system lens 33. That is to say, the reflected light is incident perpendicular with respect to the incident surface of the optical filter 32 and the light receiving surface of the CCD 31.

By using this image side telecentric optical system lens 33, then also with respect to the optical filter 32 which is positioned so as to be parallel with the light receiving surface of the CCD 31, the reflected light can be input perpendicularly thereto. As a result, the pass wavelength band of the optical filter 32 can be made to coincide with the wavelength band of the laser light generated by the laser emitting section 21, so that the input of disturbance light to the CCD 31 can be prevented. Furthermore, since the optical filter 32 is provided between the image side telecentric optical system lens 33 and the CCD 31, then even with a wide viewing angle, there is no longer the need for the wavelength band of the light passed by the optical filter 32 to be wide.

What is claimed is:

1. A distance measuring apparatus comprising:
   a laser emitting section for generating laser light;
   an imaging section for imaging reflected light of the laser light which has been reflected by a surface of a target object to be measured;
   a telecentric optical system lens for forming an image of the reflected light on the imaging section;
   an optical filter provided between the telecentric optical system lens and the imaging section on an optical axis of the telecentric optical systems lens, for passing only light of a wavelength band of laser light emitted from the laser emitting section; and
   a distance calculation section for calculating a distance to the object based on an image taken by the imaging section and based on a positional relationship between a light emission position of the laser light and an image position.

2. A self-controlled robot incorporating a distance measuring apparatus according to claim 1.

3. A self-controlled robot according to claim 2, wherein the self-controlled robot is a bipedal robot.

4. A distance measuring method comprising the steps of:
   emitting laser light onto a target object to be measured;
   perpendicularly inputting by an imaging optical system laser light reflected by the target object onto an incident surface of an optical filter which passes only light of a wavelength band of the laser light;
   imaging the reflected light which has been passed by the optical filter; and
   measuring the distance to the object based on the obtained image and a positional relationship between a light emission position of the laser light and an image position.

* * * * *